Aug. 5, 1924.
S. W. SCOFIELD ET AL
1,503,603
PROCESS OF PRODUCING CRYSTALLINE ALUMINUM SULPHATE
Original Filed Sept. 2, 1920
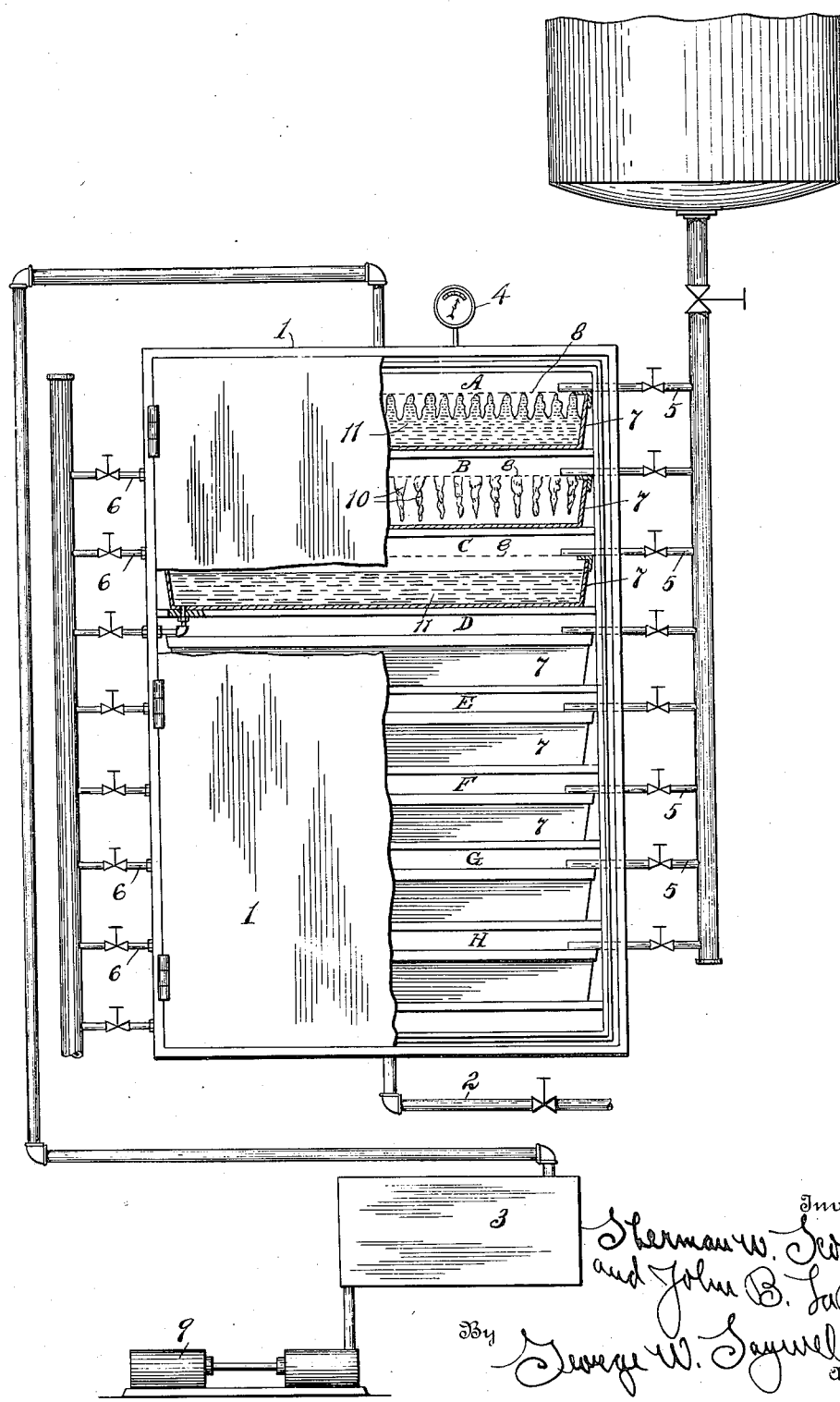

Patented Aug. 5, 1924.

1,503,603

UNITED STATES PATENT OFFICE.

SHERMAN W. SCOFIELD AND JOHN B. LA RUE, OF CLEVELAND, OHIO; SAID LA RUE ASSIGNOR TO SAID SCOFIELD.

PROCESS OF PRODUCING CRYSTALLINE ALUMINUM SULPHATE.

Original application filed September 2, 1920, Serial No. 407,724. Divided and this application filed May 17, 1922. Serial No. 561,703.

*To all whom it may concern:*

Be it known that we, SHERMAN W. SCOFIELD, and JOHN B. LA RUE, citizens of the United States, residents of Cleveland, county of Cuyahoga, and State of Ohio, have invented new and useful Improvements in Processes of Producing Crystalline Aluminum Sulphate, of which the following is a specification, the principle of the invention being herein explained and the best mode in which we have contemplated applying that principle, so as to distinguish it from other inventions.

Our invention relates to processes of producing crystalline aluminum sulphate and particularly relates to an improved method of changing aluminum hydroxide to a solution of aluminum sulphate and then obtaining from the latter crystalline aluminum sulphate. The subject matter of this application has been divided out of our pending application, Serial No. 407,724, filed Sept. 2, 1920, upon improved processes of separating the constituents of mineral silicates.

The annexed drawing and the following description set forth in detail certain steps embodying our invention, the disclosed steps, however, constituting but one of the various methods by which the principle of the said invention may be applied.

In said annexed drawing;

The figure is a partial elevation and partial central vertical section of a vacuum chamber utilized in the carrying out of our new and improved process.

Referring briefly to the disclosure contained and claimed in the above mentioned application, Serial No. 407,724, from which the subject matter of this application has been divided out, and as showing how we obtain the aluminum hydroxide which is reacted upon by the process of this application, we wish to state that we first crush crystalline potash-feldspar or reduce the same to small particles and then calcine this feldspar until it is converted into an amorphous condition. In this amorphous condition, the feldspar can be decomposed by a solution of caustic alkali at a high temperature and under pressure. We mix the calcined amorphous feldspar with caustic alkali and water, preferably a strong solution of caustic potash, and seal the same tightly in a digester where the mixture is agitated and heated for two or three hours at a temperature of substantially 265° to 271° centigrade, the pressure rising to substantially 300# per square inch. This initial action results in a substantially complete digestion of the feldspar, except that some insoluble silicates still remain in the digester in crystalline form. We continue the heat and the moisture in the digester commences to be absorbed by the mass at the bottom of the digester, the insoluble silicates becoming fused. We add more water to the digester, according to the space that is afforded, causing the pressure to rise rapidly and the temperature to drop, and the digestion has then reached a point substantially 98% to 99% complete. After the heat has been shut off and the mass allowed to stand for substantially one hour, the digester contains a concentrated solution of alkali-metal silicate and alkali-metal aluminate. We add sufficient water to the solution for the purpose of thinning it down adequately to receive carbonic acid gas by means of which silicic acid and aluminum hydroxide are precipitated and the solution contains potassium carbonate. This carbonization is effected in a standard carbonater tank and the gas is introduced, in the cold, at a pressure slightly above a normal atmospheric pressure.

As to the proportions of the ingredients utilized during the carrying out of the aforedescribed steps, we wish to state that substantially 4# of potassium feldspar can be treated with substantially 6# of potassium hydroxide, the water first added to the digester being substantially 4#, and then 4# more after the complete fusion has taken place.

The potassium carbonate solution, obtained as a result of the carbonating, is decanted off, and the precipitate leached and the leaching water added to the decanted solution. We have thus recovered the potash value from the feldspar. The alumina and silica residue is then treated with sulphuric acid in a lead-lined tank, resulting in obtaining soluble aluminum sulphate and crystalline silicic acid. The solution of aluminum sulphate is decanted off and the precipitate leached and the leaching water added to the decanted solution. These steps have resulted in the separation of the aluminum and silicon values contained in the potash. We have also thereby converted the aluminum hydroxide to a solution of aluminum sulphate, forming part of the process of this application, which sulphate will be extracted in crystalline form by the process and apparatus now to be described.

For the purpose of extracting the aluminum value in the form of crystalline aluminum sulphate, we utilize the following procedure, in connection with the apparatus shown in the accompanying drawing. This apparatus consists of a standard vacuum tank 1, connected with a steam pipe 2, running to any suitable source of supply for the steam, and a condenser 3, gauge 4, pump 9, etc. Inlets for the mother liquor 11, containing the aluminum sulphate, are indicated by the ordinal 5 and outlets therefor by the ordinal 6. The chamber 1 is subdivided into any number of suitable compartments, A, B, C, etc., and in each compartment is positioned a tray 7 forming an evaporating pan, and adjacent the top of each compartment a screen 8. By means of the inlets 5, the mother liquor 11, is introduced into the tray 7, and the chamber is then subjected to a partial vacuum of from twelve (12) to twenty-five (25) inches mercury, according to the weight of the solution, and to steam heat so as to create a temperature in the chamber 1, of from 78° to 100° Fahrenheit. This vacuum and heat results in the liquor in the tray 7, shooting up into the screen 8, as shown in compartment A in the figure, resulting in the clinging of aluminum sulphate crystals to the screens each time the solution shoots up and drops back, thus forming hanging columns 10, of these crystals, as shown in compartment B. This process continues until practically all of the aluminum sulphate in the mother liquor has been removed and is in the form of crystals hanging to the screens 8. The mother liquor is then withdrawn from the chamber 1, by means of outlets 6, and returned to the lead-lined tank and mixed with the next charge therein for the use of such sulphuric acid as may have remained in the mother liquor. A substantially complete vacuum is then created in the chamber 1, and the crystals of aluminum sulphate thus dried.

The source of the aluminum sulphate solution is not material to our improved method of crystallizing the same but we have described herein the reacting of aluminum hydroxide with sulphuric acid merely as illustrative and because this step was one of the steps of the whole improved process set forth in said application, Serial No. 407,724, for extracting the potash and other values from feldspar.

What we claim is:—

1. In processes of crystallizing aluminum sulphate out of solutions of the latter, the step which consists in subjecting the solution to a partial vacuum, causing it to boil violently, means being superposed above the evaporating pan against which the solution is thrown, said means catching the salt and retaining the same as the solution drops back.

2. In processes of crystallizing aluminum sulphate out of solutions of the latter, the step which consists in subjecting the solution to a partial vacuum, causing it to boil violently, a screen being superposed above the evaporating pan against which the solution is thrown, said screen catching the salt and retaining the same as the solution drops back.

3. In processes of crystallizing aluminum sulphate out of solutions of the latter, the step which consists in subjecting the solution to a partial vacuum and to a temperature of from 78° to 100° Fahrenheit, causing it to boil violently, means being superposed above the evaporating pan against which the solution is thrown, said means catching the salt and retaining the same as the solution drops back.

4. In processes of crystallizing aluminum sulphate out of solutions of the latter, the step which consists in subjecting the solution to a partial vacuum and to a temperature of from 78° to 100° Fahrenheit, causing it to boil violently, a screen being superposed above the evaporating pan against which the solution is thrown, said screen catching the salt and retaining the same as the solution drops back.

5. In processes of crystallizing aluminum sulphate out of solutions of the latter, the step which consists in subjecting the solution in a vacuum tank to a vacuum of from twelve (12) to twenty-five (25) inches of mercury, causing it to boil violently, means being superposed above the evaporating pan against which the solution is thrown, said means catching the salt and retaining the same as the solution drops back.

6. In processes of crystallizing aluminum sulphate out of solutions of the latter, the step which consists in subjecting the solution in a vacuum tank to a vacuum of from twelve (12) to twenty-five (25) inches of mercury, causing it to boil violently, a screen being superposed above the evaporating pan against which the solution is thrown, said screen catching the salt and retaining the same as the solution drops back.

7. In processes of crystallizing aluminum sulphate out of solutions of the latter, the step which consists in subjecting the solution in a vacuum tank to a vacuum of from twelve (12) to twenty-five (25) inches of mercury, steam being admitted to the tank to maintain a temperature therein of from 78° to 100° Fahrenheit, thus causing the solution to boil violently, means being superposed above the evaporating pan against which the solution is thrown, said means catching the salt and retaining the same as the solution drops back.

8. In processes of crystallizing aluminum sulphate out of solutions of the latter, the step which consists in subjecting the solution in a vacuum tank to a vacuum of from twelve (12) to twenty-five (25) inches of mercury, steam being admitted to the tank to maintain a temperature therein of from 78° to 100° Fahrenheit, thus causing the solution to boil violently, a screen being superposed above the evaporating pan against which the solution is thrown, said screen catching the salt and retaining the same as the solution drops back.

9. In processes of crystallizing aluminum sulphate out of solutions of the latter, the steps which consist in subjecting the solution in a vacuum tank to a vacuum of from twelve (12) to twenty-five (25) inches of mercury, steam being admitted to the tank to maintain a temperature therein of from 78° to 100° Fahrenheit, thus causing the solution to boil violently, means being superposed above the evaporating pan against which the solution is thrown, said means catching the salt and retaining the same as the solution drops back; withdrawing the mother liquor from the tank; and then drying the suspended aluminum sulphate crystals by creating a substantially perfect vacuum in the tank.

10. In processes of producing crystalline aluminum sulphate, the steps which consist in reacting between aluminum hydroxide and sulphuric acid; subjecting the resultant aluminum sulphate solution in a vacuum tank to a vacuum of from twelve (12) to twenty-five (25) inches of mercury, causing the solution to boil violently, the screen being superposed above the evaporating pan against which the solution is thrown, said screen catching the salt and retaining the same as the solution drops back; withdrawing the mother liquor from the tank for reuse with another charge of aluminum hydroxide; and then drying the suspended aluminum sulphate crystals by creating a substantially perfect vacuum in the tank.

11. In processes of crystallizing aluminum sulphate out of solutions of the latter, the steps which consist in reacting between aluminum hydroxide and sulphuric acid; subjecting the resultant aluminum sulphate solution in a vacuum tank to a vacuum of from twelve (12) to twenty-five (25) inches of mercury, steam being admitted to the tank to maintain a temperature therein of from 78° to 100° Fahrenheit, thus causing the solution to boil violently, a screen being superposed above the evaporating pan, against which the solution is thrown, said screen catching the salt and retaining the same as the solution drops back; periodically withdrawing the mother liquor from the tank for reuse with other charges of aluminum hydroxide; and drying the suspended aluminum sulphate crystals by creating a substantially perfect vacuum in the tank.

Signed by me this 4th day of May, 1922.
SHERMAN W. SCOFIELD.
Signed by me this 13th day of May, 1922.
JOHN B. LA RUE.